United States Patent [19]

Applegate

[11] Patent Number: 5,566,965
[45] Date of Patent: Oct. 22, 1996

[54] TRAILER SAFETY CHAIN ADAPTOR

[76] Inventor: John M. Applegate, 510 6th Ave., Absecon, N.J. 08201

[21] Appl. No.: 517,358

[22] Filed: Aug. 21, 1995

[51] Int. Cl.⁶ .................................. B60D 1/06; B60D 1/56
[52] U.S. Cl. ........................ 280/500; 280/511; 280/505
[58] Field of Search .................................... 280/511, 457, 280/504, 495, 505, 500, 480, 432

[56] References Cited

U.S. PATENT DOCUMENTS

| | | | |
|---|---|---|---|
| 2,788,990 | 4/1957 | Barcafer | 280/457 |
| 3,125,355 | 3/1964 | Snuggins | 280/457 |
| 3,395,933 | 8/1968 | Childs | 280/457 |
| 3,741,588 | 6/1973 | Dotterweich | 280/495 X |
| 3,806,161 | 4/1974 | Pollart et al. | 280/500 |
| 3,989,269 | 11/1976 | Rendessy | 280/457 X |
| 4,417,748 | 11/1983 | Dortch | 280/511 X |
| 4,607,858 | 8/1986 | Wagner | 280/491 |
| 5,158,316 | 10/1992 | Hutchmacher | 280/415.1 |
| 5,195,768 | 3/1993 | Hendrix | 280/428 |
| 5,246,244 | 9/1993 | Colibert | 280/495 |
| 5,362,084 | 11/1994 | Edwards | 280/457 |

*Primary Examiner*—Kevin Hurley
*Assistant Examiner*—F. Zeender
*Attorney, Agent, or Firm*—Jacobson, Price, Holman & Stern, PLLC

[57] ABSTRACT

An adaptor plate generally Y-shaped in plan is provided having a central opening formed therethrough. The adaptor plate is positionable over the step plate of a step bumper with the opening in the plate registered with the central hitch ball mounting shank receiving opening formed in the step plate and the adaptor plate is secured to the step plate through the utilization of the threaded shank of a hitch ball and the attendant nut and washer therefor. The free ends of the divergent arms of the Y-shaped adaptor plate project rearwardly of the rear margin of the step plate and have front-to-rear extending openings formed therein with which elongated hooks of trailer safety chains may be engaged and the forwardly projecting stem of the Y-shaped adaptor plate at least closely opposes the center face plate portion of the associate step bumper projecting upwardly from the forwardly margin of the step plate to thereby limit angular displacement of the adaptor plate relative to the step plate about the shank of the attaching hitch ball. The adaptor plate defines a rearwardly opening recess between the free ends of the rearwardly divergent arms of the adaptor plate and the recess provides clearance for a trailer hitch tongue coupler engaged with the hitch ball.

8 Claims, 1 Drawing Sheet

5,566,965

TRAILER SAFETY CHAIN ADAPTOR

BACKGROUND OF THE INVENTION

FIELD OF THE INVENTION

This invention relates to an adaptor plate having a central opening therethrough and positionable over the central area of the center low step plate of a vehicle rear step bumper with the opening of the adaptor plate registered with the hitch ball mounting opening in the step plate, the threaded shank of a hitch ball being secured downwardly through the openings in the adaptor and step plates.

The adaptor plate includes a forward margin which at least closely opposes the center face plate portion of the step bumper defining the forward extremity of the step plate and opposite side rear portions of the adaptor plate project rearwardly of the rear margin of the step plate and have safety chain hook engagable openings formed therethrough.

By providing the adaptor plate with a forward margin which at least closely opposes the center face plate portion of the associated step bumper, only a single fastener (comprising the threaded shank of the hitch ball) is required to secure the adaptor plate to the step plate in a manner preventing angular displacement of the adaptor plate relative to the step plate.

DESCRIPTION OF RELATED ART

Various different related tow hitch constructions individually including some of the general structural and operational features of the instant invention are disclosed in U.S. Pat. Nos. 2,788,990, 3,125,355, 4,607,858, 5,158,316, 5,195,768, 5,246,244 and 5,362,084.

However, these previously known hitch constructions do not include the overall combination of structural and operational features of the instant invention which enables a step bumper step plate to be provided with opposite side anchor points for safety chain hooks by utilizing only the threaded mounting shank of a hitch ball for securing the adaptor to the step bumper step plate against angular displacement relative thereto.

SUMMARY OF THE INVENTION

The trailer safety chain adaptor of the instant invention has been provided so as to equip an associated step bumper with opposite side anchor points for the hooks of a pair of trailer safety chains.

In many instances a step bumper is provided with a rear center step plate portion having only a central opening therein for receiving therethrough the threaded mounting shank of a hitch ball and other means must be provided on the step bumper to define anchor areas to which the hooks of a pair of safety chains of an associated trailer may be removably engaged.

In some instances owners of vehicles equipped with step bumpers will drill two additional holes through the step plate portion of the step bumper to define anchor points for safety chain hooks. However, these additional openings must be drilled through the step plate portion closely adjacent the rear margin thereof resulting in these areas of the step plate portion being weakened. Otherwise, such additional openings are drilled further forward from the rear margin of the step plate portion and the pin of a clevis is removably secured through each additional opening.

However, drilling holes through a step bumper step plate portion requires the use of a high quality drill bit as well as a large capacity drill and the cost of each large capacity clevis must be considered.

Accordingly, a need exists for an apparatus by which the central step plate portion of a step bumper not provided with safety chain hook anchoring holes may be provided with such holes without requiring any machining of the step bumper step plate portion.

The main object of this invention is to provide an adaptor which may be fixedly secured to a step bumper central step plate portion merely through the utilization of the threaded shank of an associated hitch ball and which will include structure defining a pair of opposite side openings rearward of the rear margin of the step plate portion with which safety chain hooks may be readily releasably engaged.

Another object of this invention is to provide! an adaptor in accordance with the preceding object and constructed in a manner such that the adaptor, when secured to the associated step plate portion solely through the use of the threaded mounting shank of a hitch ball, will be securely fastened to the step plate portion against angular displacement relative to the step plate portion about the hitch ball shank.

Another very important object of this invention is to provide an adaptor which will be capable of functioning as a trailer chain safety anchor and which will be further capable of transferring all shock loads exerted by trailer safety chain thereon to the usually reinforced center hitch ball mounting hole area of a step bumper step plate portion.

A final object of this invention to be specifically enumerated herein is to provide a safety chain adaptor for a vehicle step bumper in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
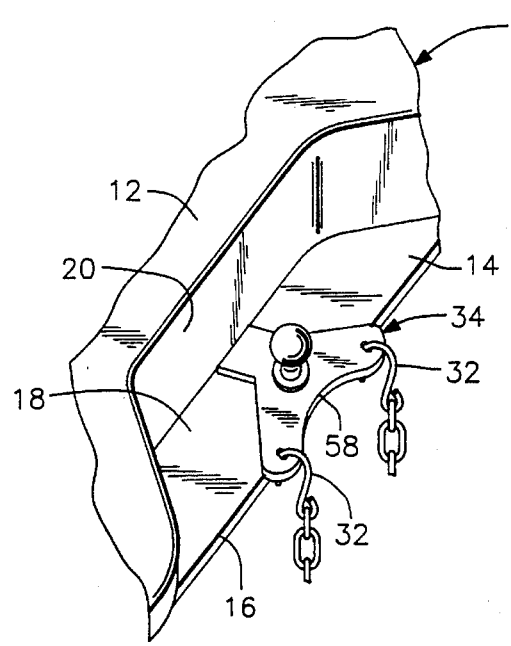
FIG. 1 is a fragmentary perspective view of the central area of a typical vehicle rear step bumper with the safety chain adaptor of the instant invention operatively associated therewith and a pair of safety chain end hooks removably engaged with the adaptor.
Figure 3:
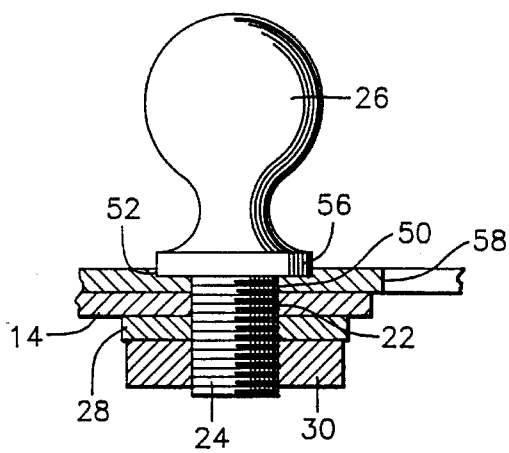
FIG. 3 is an enlarged fragmentary vertical sectional view illustrating the manner in which the hitch ball mounting shank is utilized as the sole fastener for securing the adaptor to the step bumper step plate portion.

Referring now more specifically to the drawings the numeral 10 generally designates a conventional vehicle step bumper of the type found on the rear of many pickup trucks and vans. The step bumper 10 includes a central portion 12 incorporating a step plate 14 having a rear marginal edge 16 and a front margin 18 terminating forwardly at the lower marginal edge of a vertical center face plate portion 20.

The step plate portion 14 conventionally is equipped with a center opening 22 for downwardly receiving therethrough the threaded mounting shank portion 24 of a conventional hitch ball 26. The shank portion 24 normally is secured through the opening 22 through the utilization of a lock washer 28 and threaded nut 30.

If a conventional step bumper such as the bumper 10 is provided with only the hitch ball 26 secured through the opening or bore 22 thereof, there are no anchor points provided for releasably anchoring a pair of safety chain hooks such as those indicated at 32 to the bumper 10. As previously indicated, some owners of vehicles equipped with such step bumpers have drilled extra holes or bores through the step plate 14 adjacent the rear margin 16 in order to provide anchoring points for chain hooks such as that indicated at 32.

Figure 2:
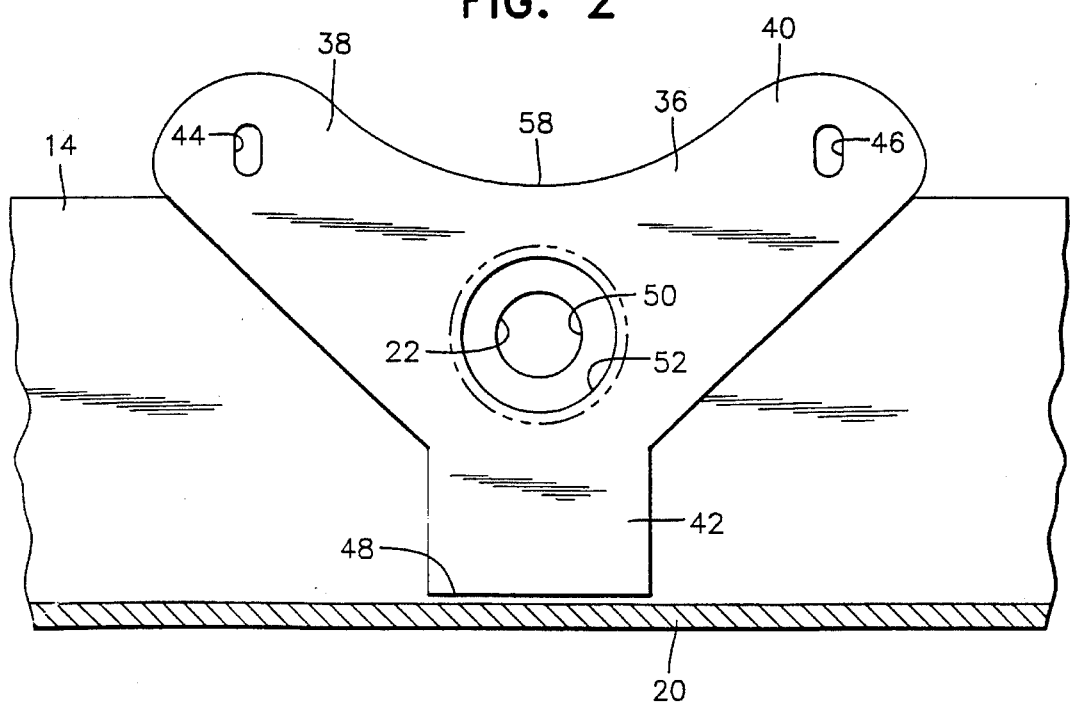
FIG. 2 is an enlarged fragmentary horizontal sectional view of the assemblage illustrated in FIG. 1 with the trailer hitch ball and safety chain hooks removed.

The adaptor of the instant invention is referred to in general by the reference numeral 34 and comprises a plate 36 which is generally Y-shaped in plan including a pair of opposite side rearwardly divergent arms 38 and 40 joined at their forward converging ends. The adaptor plate also includes a wide forward stem portion 42 projecting forwardly from the joined forward ends of the arms 38 and 40. The rear divergent ends of the arms 38 and 40 include vertical openings 44 and 46 formed therethrough, the openings 44 and 46 being slightly elongated in a front-to-rear extending direction. Further, the forward margin 48 of the stem portion 42 at least closely opposes the face plate portion 20 and the center of the adaptor plate 36 defined by the juncture of the forwardly converging ends of the arms 38 and 40 is provided with a central bore 50 including a shallow counter bore 52. The bore 50 is of the same diameter as the bore or opening 22 and, when the adaptor plate 36 is disposed over the step plate portion 14 in the manner illustrated in FIGS. 1 and 2 of the drawings, the threaded mounting shank portion 24 is downwardly received through the bores 22 and 50 and secured therethrough with the washer 28 and nut 30. The hitch ball 26 includes a cylindrical base portion 56 which is snugly seatingly received in the counter bore 52.

Thus it may be seen that the adaptor plate 36 is secured to the step plate 14 solely through the use of the hitch ball 26 having its threaded shank portion 24 downwardly secured through the bores 22 and 50. Furthermore, the safety chain hooks 32 are readily in engagable with the rear ends of the arms 38 and 40 of the adaptor plate 36 by engagement through the openings 46, which openings 46 are spaced rearward of the rear marginal edge 16 of the step plate portion 14.

With attention again invited to FIGS. 1 and 2 of the drawings, it may be seen that the front margin 48 of the stem portion 42 at least closely opposes the face plate portion 20 in a manner such that a strong pull on one of the hooks 32 tending to angularly displace the adaptor plate 36 relative to the step plate portion 14 about the threaded shank 24 will be effective only to cause slight angular displacement of the adaptor plate 36 until such time as the opposite ends of the front margin 48 engage the face plate portion 20. Thus, it is only necessary to use a single fastener (the threaded shank portion 24 of the hitch ball 26) to secure the adaptor plate 36 to the step plate 14 against unrestricted angular displacement relative to the step bumper 10.

It will be noted that the adaptor plate 36 defines a rearwardly opening recess 58 between the rear ends of the arms 38 and 40, which recess 58 provides clearance for a trailer hitch tongue coupler (not shown) engaged with the hitch ball 26.

The foregoing is considered as illustrative only of the principles of the invention. Since numerous modifications and changes readily will occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination with a vehicle rear step bumper of the type including a center, low horizontal step plate having a free rear margin and terminating forwardly at an upstanding, upwardly projecting center face plate portion of said bumper and wherein said step plate includes a central, upstanding trailer hitch ball mounting shank receiving bore formed therethrough spaced intermediate said free rear margin and said center face plate portion, a trailer safety chain adaptor plate generally Y-shaped in plan including a pair of opposite side rearwardly divergent arms joined at their forward converging ends, said adaptor plate including a wide, forward stem portion projecting forwardly from said joined forward converging ends, the rear diverging ends of said arms having vertical openings formed therethrough through which safety chain section end hooks may be engaged, said adaptor plate including an upstanding central bore formed therethrough adjacent the juncture of said arms and being disposed over said step plate with said central bore registered with said shank receiving bore, said stem portion at least closely opposing said face plate portion and said rear divergent ends projecting rearwardly of said free rear margin, said openings being spaced rearward of said free rear margin and said adaptor plate defining a rearwardly opening recess intermediate said rear divergent ends, a trailer hitch ball including a depending mounting shank removably secured downwardly through said bores and comprising the sole attachment of said adaptor plate to said step plate, a closely opposing relation of said stem portion to said face plate portion preventing angular displacement of said adaptor plate relative to said step plate about said shank.

2. The combination of claim 1 wherein said openings are elongated in a front-to-rear extending direction.

3. The combination of claim 1 wherein said recess extends forwardly to a point at least closely adjacent said free rear margin and provides clearance for a trailer hitch tongue coupler engaged with said hitch ball.

4. The combination of claim 1 wherein said central bore is disposed rearwardly of said stem portion.

5. The combination of claim 1 wherein said central bore includes an upwardly opening counter bore, said trailer hitch ball including a base flange at least partially recessed in said counter bore.

6. The combination of claim 5 wherein said central bore is disposed rearwardly of said stem portion.

7. The combination of claim 6 wherein said recess extends forwardly to a point adjacent said free rear margin and provides clearance for a trailer hitch tongue coupler engaged with said hitch ball.

8. The combination of claim 7 wherein said openings are elongated in a front-to-rear extending direction.

\* \* \* \* \*